United States Patent [19]

Nakane et al.

[11] Patent Number: 5,030,364

[45] Date of Patent: Jul. 9, 1991

[54] AQUEOUS ULTRA-DILUTE COMPOSITE SOLUTION

[75] Inventors: Shigeru Nakane, Yokohama; Kohichi Sugita, Tokyo; Hideyuki Kosaka, Chofu, all of Japan

[73] Assignee: Tecno-Bio Co., Ltd., Tokyo, Japan

[21] Appl. No.: 456,756

[22] Filed: Dec. 26, 1989

[30] Foreign Application Priority Data

Dec. 28, 1988 [JP] Japan .................... 63-329114
Jul. 14, 1989 [JP] Japan .................... 1-180569

[51] Int. Cl.$^5$ ............................ C09K 1/00
[52] U.S. Cl. .................... 252/1; 23/302 T; 423/499
[58] Field of Search .......... 252/1; 23/302 T; 423/499

[56] References Cited

U.S. PATENT DOCUMENTS

| 399,176 | 3/1989 | Watts et al. | 23/302 T |
| 3,547,597 | 5/1977 | Hays | 23/302 T |
| 3,926,566 | 12/1975 | Spurney | 23/301 SP |

FOREIGN PATENT DOCUMENTS

| 0275814 | 7/1988 | European Pat. Off. |
| 1145319 | 6/1989 | Japan . |
| 1145320 | 6/1989 | Japan . |
| 664662 | 5/1979 | U.S.S.R. . |
| 25092 | of 1911 | United Kingdom . |
| 848328 | 9/1960 | United Kingdom . |

OTHER PUBLICATIONS

Negtien, G., et al: "Medicaments Homeopathiques., Notions Pratiques De Pharmacie Homeopatique", vol. 16, Ed. 2, 1986, Galenica, Paris, Fr., pp. 404, 437.
Nouveau Traite De Chimie Minerale, Paul Pascal, tome II, 1966, Masson et Cie, Paris, FR, pp. 291-314.
American Chemical Society, File supplier STN; "Chemical Abstracts", vol. 102, No. 10, abstract No. 88824e.
I. Tarjan et al: "Laboratory Manual on Crystal Growth", 1972, pp. 64-70.
Journal of Crystal Growth, vol. 62, 1983, pp. 401-408.

*Primary Examiner*—Robert L. Stoll
*Assistant Examiner*—N. Bhat
*Attorney, Agent, or Firm*—Armstrong, Nikaido, Marmelstein, Kubovcik & Murray

[57] ABSTRACT

An aqueous ultra-dilute composite solution, which comprises $1.4 \times 10^{-7}$ to $2.7 \times 10^3$ ppm of a chlorine ion, and $4 \times 10^{-12}$ to $4 \times 10^{-3}$ ppm of a sodium ion or $7 \times 10^{-8}$ to $1.3 \times 10^3$ ppm of an iron ion, and is capable of forming sodium chloride having an oblate tetrahedral crystal form.

7 Claims, 2 Drawing Sheets

AQUEOUS ULTRA-DILUTE COMPOSITE SOLUTION

BACKGROUND OF THE INVENTION

1. Field of the Invention

The present invention relates to an aqueous ultra-dilute composite solution capable of converting conventional sodium chloride having a usual crystal form to sodium chloride having a novel crystal form. Furthermore, the present invention relates to an aqueous ultra-dilute composite solution having the functions of promoting the growth of plants, maintaining freshness, preventing a corrosion of metals, and improving the combustion efficiency of fuels.

2. Description of the Related Art

After several years research, the inventor succeeded in preparing a novel aqueous ultra-dilute composite solution. This aqueous ultra-dilute composite solution can convert conventional sodium chloride having a halite-type structure and a cubic or cubic octahedral (tetradecahedral) crystal form to sodium chloride having a novel and particular crystal form. The inventor found that sodium chloride having a particular crystal form exerts the functions of improving the chemical stability of a skin medicine for external application or controlling an adverse reaction of this medicine, and that an aqueous solution containing this sodium chloride and iron chloride has a surprising activity-promoting action. By the term activity-promoting action is meant a property such that a positive effect is exerted for the maintaining of life in an organism, and a positive effect is exerted for reinforcing a characteristic inherently possessed by a substance, for example, an energy-converting action, in an inanimate object.

The inventor also found that the ultra-dilute composite aqueous solution of the present invention has the functions of promoting the growth of plants, maintaining freshness, preventing a corrosion of metals, and improving the combustion efficiency of fuels.

SUMMARY OF THE INVENTION

Accordingly, the object of the present invention is to provide a novel aqueous ultra-dilute composite solution having the above-mentioned unexpected characteristics.

Other objects and advantages of the present invention will be apparent from the following description.

In accordance with the present invention, there is provided an aqueous ultra-dilute composite solution, which comprises $1.4 \times 10^7$ to $2.7 \times 10^3$ ppm (by weight), preferably $2.8 \times 10^{-5}$ to 8 ppm of a chlorine ion, and $4 \times 10^{-12}$ to $4 \times 10^{-3}$ ppm (by weight), preferably $4 \times 10^{-8}$ to $4 \times 10^{-4}$ ppm of a sodium ion or $7 \times 10^{-8}$ to $1.3 \times 10^3$ ppm (by weight), preferably $1.5 \times 10^{-5}$ to 4 ppm of an iron ion, and is capable of forming sodium chloride having an oblate tetrahedral crystal form.

BRIEF DESCRIPTION OF THE DRAWINGS

The present invention will be better understood from the description set forth below with reference to the accompanying drawings, wherein.

DESCRIPTION OF THE PREFERRED EMBODIMENTS

Figure 1:
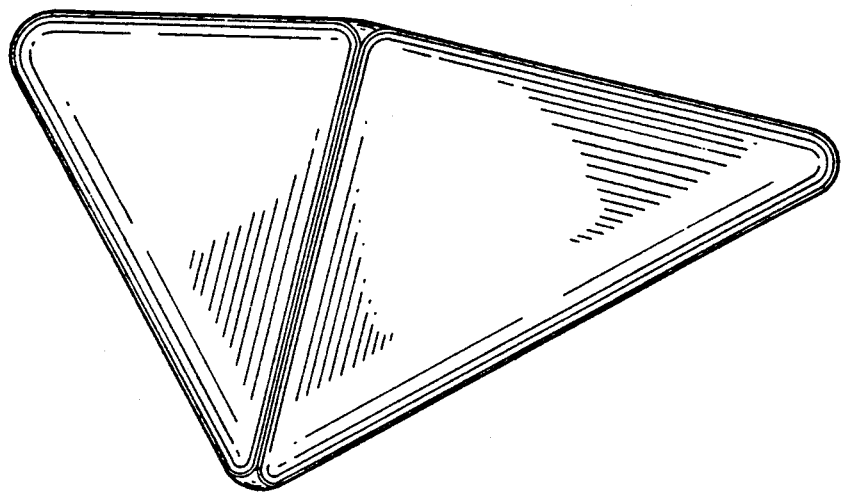
FIG. 1 is a perspective view of sodium chloride composed of a relatively small crystals having an oblate tetrahedral form according to the present invention.

An aqueous sodium ion-containing ultra-dilute composite solution of the present invention can be prepared, for example, by the following process. More specifically, a chloride is added to an aqueous alkaline solution containing a sodium ion to form a sodium-containing alkaline liquid mixture, the liquid mixture is allowed to stand at a temperature of 30° to 40° C. for a predetermined time (e.g., 3 to 6 hours or at ordinary temperature for 12 to 18 hours), insoluble substances are removed by filtration, the filtrate is neutralized with hydrochloric acid, the neutralized liquid is dried, the formed salt is crystallized, and the crystallized salt is dissolved in water. The solution is diluted at about $10^5$ to about $10^{14}$ times, based on the weight of the crystal, with water to obtain an intended aqueous ultra-dilute composite solution.

Sodium contained in the above-mentioned alkaline liquid mixture can be contained in one of the starting materials of the liquid mixture, i.e., the aqueous alkaline solution or the chloride.

The above-mentioned alkaline liquid mixture can be prepared by adding a chloride such as magnesium chloride ($MgCl_2$), zinc chloride ($ZnCl_2$), calcium chloride ($CaCl_2$) or ferric chloride ($FeCl_3.6H_2O$) in an amount of 0.00005 to 0.001 gram-equivalent to an aqueous alkaline solution containing a sodium compound such as sodium carbonate or sodium hydroxide in an amount of 0.1 to 1 gram-equivalent per liter, preferably 0.2 to 0.5 gram-equivalent per liter, or by adding a hydroxide such as magnesium hydroxide [$Mg(OH)_2$], zinc hydroxide [$Zn(OH)_2$] or calcium hydroxide [$Ca(OH)_2$] to water, dissolving the hydroxide in water while stirring (only a small amount of the hydroxide is dissolved) to form a saturated aqueous solution, and adding sodium chloride to the saturated aqueous solution so that the concentration is 2 to 5% by weight.

The sodium-containing alkaline liquid mixture thus obtained is gradually heated at a temperature of 30° to 40° C. for 3 to 6 hours, or is allowed to stand at normal temperature for 12 to 18 hours, the solution is then filtered through a filter paper to remove solids, and the filtrate is neutralized by the addition of hydrochloric acid. The aqueous neutral solution thus obtained is gradually evaporation-solidified on a water bath, to obtain a crystalline salt, and then 1 mg of the salt obtained by evaporation solidification is again dissolved in 1 l of water, and a transition metal salt such as ferric chloride ($FeCl_3\ 6H_2O$), manganese chloride ($MnCl_2$) is added in an amount of 2 to 40% by weight, preferably 5 to 25% by weight, to the aqueous neutral solution according to need. The solution is then further diluted with distilled water, at a dilution rate of, for example, $10^5$ to $10^{14}$ times, preferably $10^{10}$ to $10^{12}$ times, based on the crystal formed by the evaporation solidification, and thus an aqueous sodium ion-containing ultra-dilute composite solution is obtained.

An aqueous iron ion-containing ultra-dilute composite solution of the present invention can be prepared, for example, by the following process. More specifically, iron is gradually heated, for example, to 400° to 1100° C. over a period of 30 minutes to 3 hours. The surface of the heated iron is then exposed to steam, to prepare an iron-iron oxide composite having a surface covered with iron oxide. Alternatively, instead of the above-mentioned iron-iron oxide composite, a mixture is prepared by adding an iron salt in an amount of 1 to 50% by weight to 1 part by weight of iron. Examples of the iron salt used in the present invention are iron sulfate, iron oxide, and iron nitrate. Hydrochloric acid is added in an amount of the same to 4 times moles to the total moles of the iron contained in the iron and the iron oxide of the mixture or composite obtained above, the mixture or composite is allowed to stand until the iron is substantially dissolved, and insoluble substances are removed by filtration. Then a metal chloride such as zinc chloride, magnesium chloride or calcium chloride is added to the filtrate, so that the concentration in the mixture is 0.1% to 5% by weight, the mixture is allowed to stand, and optionally, hydrochloric acid (e.g., in an amount of dissolving the metal chloride) and/or a transition metal salt such as ferric chloride, manganese chloride in an amount of 1% to 10% by weight is added, whereby a starting liquid is prepared. The starting liquid is diluted $10^4$ to $10^8$ times with distilled water to prepare an aqueous iron ion-containing ultra-dilute composite solution.

The aqueous iron ion-containing ultra-dilute composite solution contains $9 \times 10^{-5}$ to 7 ppm of a chlorine ion.

The aqueous ultra-dilute composite solution of the present invention is water containing $1.4 \times 10^{-7}$ to $2.7 \times 10^3$ ppm of a chlorine ion, and $4 \times 10^{-12}$ to $4 \times 10^{-3}$ ppm of a sodium ion or $7 \times 10^{-8}$ to $1.3 \times 10^3$ ppm of an iron ion.

Figure 2:
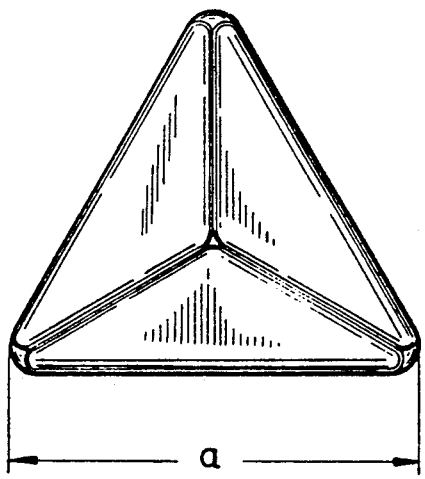
FIG. 2 is a plane view of the crystal shown in FIG. 1.
Figure 3:
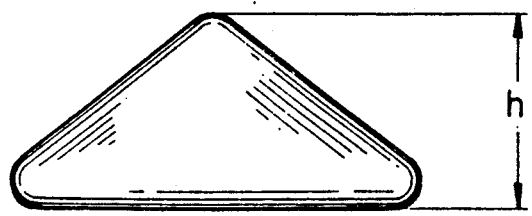
FIG. 3 is a front view of the crystal shown in FIG. 1.
Figure 4:
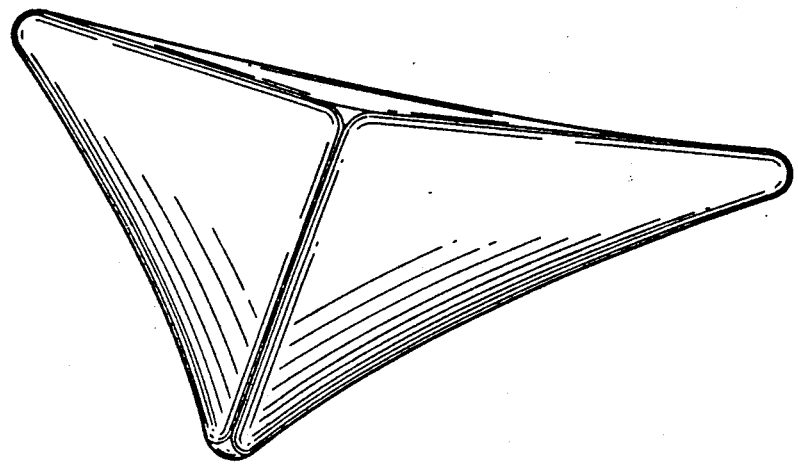
FIG. 4 is a perspective view of sodium chloride composed of a relatively large crystal having an oblate tetrahedral form according to the present invention.
Figure 5:
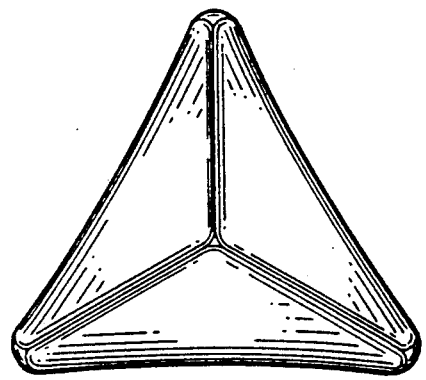
FIG. 5 is a plane view of the crystal shown in FIG. 4.
Figure 6:
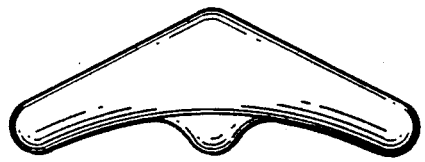
FIG. 6 is a front view of the crystal shown in FIG. 4.

When sodium chloride, for example, sodium chloride of the guaranteed reagent class, is added to the aqueous ultra-dilute composite solution of the present invention in an amount of 0.1 to 30% by weight, and evaporation is effected according to various methods, sodium chloride having a particular crystal form can be obtained. The yield is further improved if recrystallization is repeated. The yield of sodium chloride having a particular crystal form is 0.1 to 10% in the case of the aqueous sodium ion-containing ultra-dilute composite solution, and the yield of sodium chloride having a particular crystal form is 0.1% to 5% in the case of the aqueous iron ion-containing ultra-dilute composite solution. Sodium chloride having a novel crystal form has an oblate tetrahedral form in which one height of a regular tetrahedron is shortened, as shown in FIGS. 1 through 3. More precisely, the form consists of three side faces having substantially the same isosceles triangular shapes (with the proviso that the equal sides are shorter than the base) and one substantially regular triangular base, in which each of the vertexes is slightly rounded. The degree of flatness of this crystal changes over a broad range, and in general, with an increase of the size of the crystal, the degree of flatness is increased. If the degree of flatness is expressed by using the length a of one side of the regular triangular base (see FIG. 2) and the shortest height h of the oblate tetrahedrons (see FIG. 3), the degree of flatness is such that the a/h ratio is from 1/0.8 to 50/1. In the case of a relatively small crystal (for example, the length of one side a of the regular triangular base is about 0.05 mm), the a/h ratio is from 1/0.8 to 5/1, and in the case of a relatively large crystal (for example, the length a of one side is about 1 mm), the a/h ratio is from 5/1 to 10/1. If the crystal further grows and the length a of one side becomes about 1.5 mm, as shown in FIGS. 4 through 6, the degree of flatness further increases, and the a/h ratio is from 5/1 to 50/1 and the central region of the base is dented, with the result that the three vertexes of the base project.

The term "oblate tetrahedral form" used in the present specification includes all of the shapes described hereinbefore with reference to FIGS. 1 to 6.

The size of sodium chloride of the oblate tetrahedral crystal form changes in a broad range according to the crystallization conditions, but in general, the size is about 0.05 to about 3 mm.

This oblate tetrahedral crystal exerts various effects described in the specification of Japanese patent application No. 63-151262.

When a fuel, for example, coal, is treated with the aqueous ultra-dilute composite solution of the present invention, the combustion performance of the treated fuel is better than that of an untreated fuel. Furthermore, the anti-corrosive effect is enhanced for a metal, for example, a reinforcing rod. Furthermore, the aqueous ultra-dilute composite solution of the present invention exerts a function of maintaining the freshness of a plant, for example, a cut flower. When a transition metal salt, for example, ferric chloride, or an oil-soluble vitamin, for example, α-tocopherol, ubiquinone or glucose is incorporated in the aqueous ultra-dilute composite solution of the present invention, an effect of maintaining these actions for a long time is obtained. Where the aqueous ultra-dilute composite solution of the present invention is used when mixed with silicon, calcium, aluminum, potassium, ammonium, carbon or starch, the aqueous composite solution can be utilized as a waste water-treating agent, a soil improver, a carcinostatic agent, or a fodder-fortifying agent. Moreover, if a zinc salt (for example, zinc chloride) is incorporated into the aqueous iron ion-containing ultra-dilute composite solution of the present invention, the anti-corrosive effect and fungicidal effect are improved, and when a magnesium salt, for example, magnesium chloride is incorporated, the bactericidal-fungicidal effect is improved and the plant growth-promoting effect is improved.

When the above-mentioned metal chlorides are incorporated in the aqueous sodium ion-containing ultra-dilute composite solution of the present invention, the above-mentioned actions become conspicuous.

The above-mentioned actions are similarly exerted when usual ceramics are prepared by using the aqueous ultra-dilute composite solution.

Still further, when a ceramic ware or zeolite is immersed in the aqueous ultra-dilute composite solution of the present invention, the ceramic ware or zeolite exerts the above-mentioned effects.

EXAMPLES

The present invention will now be further described in detail with reference to, but is by no means limit to, the following Examples.

EXAMPLE 1

To 100 ml of a 0.5N aqueous solution of sodium hydroxide, 5 mg of ferric chloride was added and the mixture was stirred. Then the mixture was allowed to stand at normal temperature for about 14 hours and was filtered through a filter paper to remove insoluble components. The resultant filtrate was neutralized with 1N hydrochloric acid and the aqueous neutral solution was gradually evaporation-solidified on a water bath to obtain a crystal. Then, in 1000 ml of distilled water was dissolved 1 mg of the obtained crystal, and the solution was diluted $10^6$ times with distilled water to obtain an aqueous ultra-dilute composite solution.

The constitution ratios (by weight) of the respective elements in the resultant crystal after the drying step were as follows (ICP emission spectroscopic analysis).
Chlorine: 60.0%
Sodium: 39.5%
Iron: 0.01 to 0.1%
Other elements (potassium and the like): trace

EXAMPLE 2

To 100 ml of 0.5N sodium hydroxide, 5 mg of magnesium chloride was added, and the mixture was stirred and then gradually heated at 30° C. for 6 hours. Then the heated liquid was filtered through a filter paper to remove insoluble components, the resultant filtrate was neutralized with 1N hydrochloric acid, and the neutral aqueous solution was gradually evaporation-solidified on a water bath to obtain a crystal. Then in 1000 ml of distilled water was dissolved 1 mg of the obtained crystal, 5 g of ferric chloride ($FeCl_3 \cdot 6H_2O$) was added to 50 ml of the obtained aqueous solution, and distilled water was further added so that the total volume was 1000 ml. The solution was diluted $10^6$ times with distilled water to obtain an aqueous ultra-dilute composite solution.

The constitution ratios (by weight) of the respective elements in the crystals were as follows (ICP emission spectroscopic analysis).
Chlorine: 60.0%
Magnesium: <0.01%
Sodium: 39.5%
Other elements: trace

EXAMPLE 3

A 1.5 g amount of iron piece (SPCC-5B) was heated stepwise. Namely, the iron piece was heated at 400° C. for 30 minutes, at 800° C. for 30 minutes and at 950° C. for about 1 hour. Steam was sprayed on the surface of the heated iron piece to form iron oxide on the surface of the iron piece. The iron piece was then thrown into 30 ml of 12N hydrochloric acid, and after stirring, the iron piece was allowed to stand for 7 days. After dissolution of the iron piece, the liquid was filtered to remove insoluble substances, 0.95 g of magnesium chloride was added to the filtrate, and the liquid was allowed to stand for 24 hours. Then hydrochloric acid was added to the liquid so that the total volume was 100 cc, whereby the starting liquid was prepared. Then, 1 ml of the starting liquid was diluted $10^6$ times by adding distilled water twice, to obtain an aqueous ultra-dilute composite solution.

When the starting liquid was analyzed, the following results were obtained.
Iron: 1.5%
Magnesium: 0.2%
Chlorine: 16%
Water: 82%
Other components: 0.3%

EXAMPLE 4

The following components were kneaded at the following ratios, and while 100 ml of the aqueous ultra-dilute composite solution prepared in Example 3 was added to 100 g of the obtained mixture, the mixture was gradually heated from 450° C. to 1200° C. and was sintered at 1200° C. for about 2 days. Then, 4 g of the thus-prepared ball-shaped ceramic material was immersed in 1 l of well water, and the ceramic material was removed to obtain an aqueous ultra-dilute composite solution.
Clay: 60%
Zeolite: 30%
Cristobalite: 5%
Coke: 2%
Others (sawdust, magnesia lime, copper powder, alumina powder and the like): 3%

EXAMPLE 5

A 1.5 g amount of iron piece (SPCC-5B) was heated stepwise. Namely, the iron piece was heated at 400° C. for 30 minutes, at 800° C. for 30 minutes and at 950° C. for about 1 hour. Steam was sprayed on the surface of the heated iron piece to form iron oxide on the surface of the iron piece. Then the iron piece was thrown in 30 ml of 12N hydrochloric acid, and after stirring, the iron piece was allowed to stand for 7 days. After dissolution of the iron piece, insoluble substances were removed by filtration, 1.11 g of calcium chloride was added to the filtrate, and the liquid was allowed to stand for 24 hours. Then hydrochloric acid was added to the liquid so that the total volume was 100 ml, whereby a starting liquid was prepared. Then 1 ml of the starting liquid was diluted $10^6$ times by adding distilled water twice to obtain an aqueous ultra-dilute composite solution. When the starting liquid was analyzed, the following results were obtained.
Iron: 1.5%
Calcium: 0.4%
Chlorine: 16%
Water: 82%
Other components: 0.1%

EXAMPLE 6

The aqueous ultra-dilute composite solution of the present invention obtained in Example 1 is designated as sample No. 1.

The aqueous ultra-dilute composite solution of the present invention prepared in Example 2 is designated as sample No. 2.

The aqueous ultra-dilute composite solution of the present invention obtained in Example 3 is designated as sample No. 3.

The aqueous ultra-dilute composite solution of the present invention obtained in Example 4 is designated as sample No. 4.

To 100 ml of each of the aqueous ultra-dilute composite solutions of sample Nos. 1 through 4.30 g of sodium chloride of the special guaranteed reagent class was added, each solution was evaporated on a water bath, and recrystallization was repeated several times. In the obtained crystals, the proportions of the oblate tetrahedral crystal form, cubic crystal form, and the like were as shown below.

| Sample No. | Oblate Tetrahedral Crystal Form | Cubic Form and the Like |
| --- | --- | --- |
| 1 | 6 | 94 |
| 2 | 6 | 94 |
| 3 | 2 | 98 |
| 4 | 10 | 90 |

An iron piece an αtocopherol were added to the aqueous ultra-dilute composite solution of the present invention obtained in Example 5, sodium chloride of the special guaranteed reagent class was further added, and the solution was evaporation-solidified to obtain a crystal of the oblate tetrahedral form.

When only the oblate tetrahedral crystals of sample Nos. 1 to 4 were collected and analyzed, it was found that the melting point was 799° C., and the results (%) of the elementary analysis were as follows:

Cl: 61.4, Na: 37.7, others: 0.9

When the lattice constant of this oblate tetrahedral crystal was determined by wide angle X-ray diffractometry, it was found that the value of the lattice constant was $a = 5.6385 (\pm 0.0003)$ Å.

In the above-mentioned wide angle X-ray diffractometry, as the X-ray generator, a Model RU-200B (rotary anticathode type) supplied by Rigaku Denki (the X-ray source: CuK $\alpha$, a curved crystal monochrometer (graphite), the output: 40 kV and 150 mA) was used. As the goniometer, a Model 2155D supplied by Rigaku Denki (the slit system: 1°–0.15 mm–1°, the detector: a scintillation counter) was used. As the counting recorder, a Model RAD-B supplied by Rigaku Denki was used.

The assignment of peaks by $K\alpha_1$ and $K\alpha_2$ to Miller indices were determined with reference to JCPDS card (5-0628). By using the assigned Miller indices and the values of the diffraction angles of the peaks, the lattice constants were determined by the method of least squares, based on the premise that the crystal was of the cubic system. Note, the weight ratio at the method of least squares of the diffraction peaks by $K\alpha_1$ and $K\alpha_2$ was made in agreement with the intensity ratio and was set at 2/1. The lattice constant of NaCl (halite) registered in JCPDS card (5-0628) was $a = 5.6402$ Å.

EXAMPLE 7

A beaker was charged with 1 g of the mixture of sodium chloride of the oblate tetrahedral crystal form obtained by adding 30 g of sodium chloride of the special guaranteed reagent class to 100 ml of the aqueous ultra-dilute composite solution of sample No. 3 and evaporation-solidifying the solution, and the mixture was diluted $10^6$ times with distilled water. Then ferric chloride ($FeCl_3.6H_2O$) was added to the dilution so that the concentration was 24% w/v. After stirring, the liquid was allowed to stand at normal temperature overnight. The aqueous solution thus obtained is designated as starting solution A.

The starting solution A was further diluted $10^9$ times with distilled water and charged in a beaker. A stem of a rose for flower arrangement was immersed in the solution. The stem portion was cut off along a length of about 5 cm in the solution and the remaining portion was immersed for 20 minutes. Then, the stem was thoroughly rinsed with city water and inserted in a flower vase filled with city water, and the vase was kept in a room at a place at which the direct rays of the sun were not imposed.

In the case of the rose not immersed in the solution containing the starting solution A, a change was observed in the flower on the fourth day and the leaves and stem were withered on the seventh day. In contrast, in the case of the rose immersed in the above-mentioned solution, a change was observed in the flower on the tenth day and the flower became wilted, but no substantial change was observed in the leaves and stem, which were still normal by the 20th day.

EXAMPLE 8

For comparison, an aqueous solution having the same composition as described in Example 1 was prepared as sample No. 5. More specifically, 998 mg of sodium chloride of the special guaranteed reagent class and 1.7 mg of ferric chloride were added to 100 ml of distilled water, and the mixture was stirred. Then 999 ml of distilled water was added to 1 ml of the resultant solution, and the resultant aqueous solution was diluted $10^6$ times with distilled water to prepare an aqueous solution of sample No. 5 having the same composition as described in Example 1.

As another comparison, an aqueous solution as sample No. 6 was prepared in the same manner as described in Example 1 except that the drying step was omitted. More specifically, 5 mg of ferric chloride was added to 100 ml of 0.5N sodium hydroxide and the mixture was stirred. After the stirring, the mixture was allowed to stand for 14 hours, and was filtered through a filter paper to remove insoluble components. The obtained filtrate was neutralized with 1N hydrochloric acid, 0.05 ml of the aqueous neutral solution was collected, and distilled water was added thereto so that the total volume was 1000 ml. The solution was diluted $10^6$ times with distilled water to obtain sample No. 6.

The above-mentioned sample Nos. 1 through 3, No. 5 and No. 6 were tested in the following manner. Each sample was separately charged in each beaker, the cut portions of the stems of five roses for flower arrangement were immersed in the sample, and the stem portions were cut off along a length of about 5 cm in the sample solution, and the roses were immersed in the sample solution in this state for 30 minutes. Then, the stems were thoroughly rinsed with distilled water, put into a vase filled with distilled water, and the vase was set in a room at a place at which direct rays of the sun were not imposed. Changes of the flowers, stems and leaves were observed, and the results are shown in Table 1.

TABLE 1

| Sample No. | Day on Which Change Was Observed in Flowers | Changes of Stems and Leaves |
| --- | --- | --- |
| 1 (present invention) | 11th day | withered on 21st day |
| 2 (present invention) | 10th day | withered on 21st day |
| 3 (present invention) | 8th day | withered on 16th day |
| 5 (comparison) | 4th day | withered on 6th day |
| 6 (comparison) | 6th day | withered on 10th day |

EXAMPLE 9

For comparison, an aqueous solution having the same composition as that of sample No. 3 was prepared as sample No. 7.

More specifically, 22.7 mg of ferrous chloride, 0.95 mg of magnesium chloride, and 5 mg of ferric chloride were added to 100 ml of 7.2N hydrochloric acid.

Then 1 ml of the solution was diluted $10^6$ times as a whole with distilled water twice, to obtain an aqueous solution having the same composition as that of sample No. 3, i.e., sample No. 7. The aqueous ultra-dilute composite solution of the present invention obtained in Example 5 was used as sample No. 11.

The above-mentioned sample Nos. 3, 7 and 11 were tested in the following manner. Namely, the sample was charged in a beaker, and the cut portions of the stems of five carnations for flower arrangement were immersed in the sample solution. Then the stem portions were cut off along a length of about 5 cm, and the carnations were immersed in this state for 30 minutes. Then the stem portions were thoroughly rinsed with distilled water, and put in a vase filled with distilled water. The vase was set in a room at a place at which direct rays of the sun were not imposed. Changes of the flowers, stems and leaves were observed, and the results are shown in Table 2.

TABLE 2

| Sample No. | Day on Which Change Was Observed in Flowers | Change of Stems and Leaves |
| --- | --- | --- |
| 3 (present invention) | 11th day | withered on 20th day |
| 11 (present invention) | 10th day | withered on 18th day |
| 7 (comparison) | 5th day | withered on 8th day |

EXAMPLE 10

The combustion test of coal (coal dust), more specifically the combustion test of the volatile in the coal was carried out by using sample Nos. 1 through 3 and 5 through 7. Namely, 4 ml of the aqueous solution of each sample of the above-mentioned six solutions was charged in an evaporating dish and 4 g of coal (coal dust) was added thereto, and the mixture was stirred and allowed to stand overnight so that the aqueous sample solution was adsorbed completely by the coal. The evaporating dish was heated for 5 minutes from the upper and lower sides to effect combustion, the weight of the residue was measured, and the loss in 4 g of the coal was determined. The loss expressed in terms of % by weight was as follows:
Sample No. 1: 36.6%,
Sample No. 2: 30.5%,
Sample No. 3: 31.6%,
Sample No. 5: 37.1%,
Sample No. 6: 19.2%,
Sample No. 7: 17.3%

When the coal used at the test was analyzed, it was found that the water content (i.e., loss by heating at 107° C. for 60 minutes) was 18%, the volatile component content (i.e., loss by heating at 150° C. for 7 minutes) was 28.5%, the ash content (residue after heating at 750° C. for 3 minutes) was 14.8% and the fixed carbon content (remainder other than water, volatile component, and ash) was 54.9%. From the foregoing results, it is seen that, in the case of sample Nos. 5, 6 and 7, only about ½ of the volatile component was burnt, and in the case of sample Nos. 1 through 3, the volatile component and a part of fixed carbon were burnt. Accordingly, it is understood that, if the aqueous ultra-dilute composite solution of the present invention is used for forming a coal slurry, the combustion energy efficiency can be improved.

EXAMPLE 11

Each of six beakers was charged with 203 ml of sea water, 3 g of calcium hydroxide and 2.5 ml of a rust preventive (Parik C supplied by Fujisawa Yakuhin Kogyo), and sample Nos. 1 through 3, 5, 6 and 8 (distilled water containing 10 ml of the above-mentioned rust preventive) were added to these beakers, respectively, so that the total volume in each beaker was 500 ml. A reinforcing iron rod having a polished surface and a reference electrode were placed in each beaker, and the natural electrode potential was measured. The results are shown in Table 3.

TABLE 3

| Sample No. | Natural Electrode Potential (mV) | | |
| --- | --- | --- | --- |
| | at start | after 15 hours | after 48 hours |
| 1 (present invention) | 330 | 260 | 260 |
| 2 (present invention) | 340 | 270 | 270 |
| 3 (present invention) | 290 | 240 | 240 |
| 5 (comparison) | 520 | 540 | 590 |
| 6 (comparison) | 460 | 510 | 610 |
| 8 (comparison) | 258 | 258 | 270 |

From the foregoing data, it is understood that if the aqueous ultra-dilute composite solution of the present invention is used instead of water, the amount of rust preventive used can be reduced to less than 25%.

EXAMPLE 12

An aqueous solution having the same composition as that of sample No. 3 was prepared as a comparative sample designated as "sample No. 9". Namely, 2.6 mg of ferrous chloride and 0.95 mg of magnesium chloride were added to 100 ml of 7.2N hydrochloric acid. Then, 1 ml of the obtained solution was diluted $10^6$ times with distilled water twice. Thus, an aqueous solution having the same composition as that of sample No. 3 was prepared as sample No. 9.

Each of three beakers was charged with 203 ml of a salt solution specified in JIS A-6205, 3 g of calcium hydroxide, and 2.5 ml of a rust preventive (Parik C supplied by Fujisawa Yakuhin Kogyo). Sample No. 3, 9 and 10 (distilled water containing 10 ml of the above-mentioned rust preventive) were added to the beakers, respectively, so that the total volume in each beaker was 500 ml. A reinforcing iron rod having a polished surface and a reference electrode were placed in each beaker, and the natural electrode potential was measured. The results are shown in Table 4.

TABLE 4

| Sample No. | Natural Electrode Potential (mV) | | |
| --- | --- | --- | --- |
| | at start | after 15 hours | after 48 hours |
| 3 (present invention) | 340 | 300 | 300 |
| 9 (comparison) | 290 | 310 | 350 |
| 10 (comparison) | 258 | 258 | 270 |

From the foregoing data, it is understood that if the aqueous ultra-dilute composite solution of the present invention is used instead of water, the amount of the rust preventive used can be reduced to less than 25%.

We claim:

1. An aqueous ultra-dilute composite solution, comprising $1.4 \times 10^{-7}$ to $2.7 \times 10^3$ ppm of a chlorine ion, and $4 \times 10^{-12}$ to $4 \times 10^{-3}$ ppm of a sodium ion or $7 \times 10^{-8}$ to $1.3 \times 10^3$ ppm of an iron ion which is capable of forming a sodium chloride having an oblate tetrahedral crystal form.

2. An aqueous ultra-dilute solution as claimed in claim 1, wherein the amount of the chlorine ion is $2.8 \times 10^{-5}$ to 8 ppm.

3. An aqueous ultra-dilute solution as claimed in claim 1, wherein the amount of the sodium ion is $4 \times 10^{-8}$ to $4 \times 10^{-4}$ ppm.

4. An aqueous ultra-dilute solution as claimed in claim 1, wherein the amount of the iron ion is $1.5 \times 10^{-5}$ to 4 ppm.

5. A method of preparing an aqueous ultra-dilute composite solution containing $1.4 \times 10^{-7}$ to $2.7 \times 10^3$ ppm of a chlorine ion and $4 \times 10^{-12}$ to $4 \times 10^{-3}$ ppm of a sodium ion comprising the steps of:
   (i) adding a chloride to an alkaline solution containing a sodium ion to form a sodium-containing alkaline liquid mixture;
   (ii) allowing the liquid mixture to stand at a temperature of 30° to 40° C. for 3 to 6 hours or at ordinary temperature for 12 to 18 hours;
   (iii) removing insoluble substances by filtration;
   (iv) neutralizing the filtrate with hydrochloric acid;
   (v) drying the neutralized liquid;
   (vi) crystallizing the formed salt;
   (vii) dissolving the crystallized salt in water; and,
   (viii) diluting the aqueous solution with water.

6. A method of preparing an aqueous ultra-dilute composite solution $1.4 \times 10^{-7}$ to $2.7 \times 10^3$ ppm of a chlorine ion and $7 \times 10^{-8}$ to $1.3 \times 10^3$ ppm of an iron ion comprising the steps of:
   (i) gradually heating iron at 400° to 1100° C. for 30 minutes to 3 hours;
   (ii) exposing a surface of the heated iron to steam to form an iron-iron oxide composite having a surface covered with iron oxide;
   (iii) adding the same to 4 times mole of hydrochloric acid to the total moles of the iron contained in the iron and iron oxide of the mixture or composite;
   (iv) allowing the resultant mixture to (stand until the iron is substantially dissolved;
   (v) removing insoluble substances by filtration;
   (vi) adding a metal chloride to the filtrate in an amount of 0.1 to 5% by weight based upon the total amount of the filtrate;
   (vii) allowing the mixture to stand;
   (viii) optionally, adding hydrochloric acid and/or a transition metal salt; and,
   (ix) diluting the resultant liquid $10^4$ to $10^8$ times with water.

7. A method of preparing an aqueous ultra-dilute composition containing $1.4 \times 10^{-7}$ to $2.7 \times 10^3$ ppm of a chlorine ion and $7 \times 10^{-8}$ to $1.3 \times 10^3$ ppm of an iron ion comprising the steps of:
   (i) preparing a mixture of iron and an iron oxide by adding 1 to 50% by weight of iron to 1 part by weight of an iron oxide;
   (ii) adding the same to 4 times mole of hydrochloric acid to the total moles of the iron contained in the iron and iron oxide of the mixture or composite;
   (iii) allowing the resultant mixture to stand until the iron is substantially dissolved;
   (iv) removing insoluble substances by filtration;
   (v) adding a metal chloride to the filtrate in an amount of 0.1 to 5% by weight based upon the total amount of the filtrate;
   (vi) allowing the mixture to stand;
   (vii) optionally, adding hydrochloric acid and/or a transition metal salt; and,
   (viii) diluting the resultant liquid $10^4$ to $10^8$ times with water.

* * * * *